United States Patent [19]

Seim et al.

[11] 3,767,525
[45] Oct. 23, 1973

[54] IRRADIATION SUBASSEMBLY

[75] Inventors: Orville S. Seim, Wheaton; Erwin C. Filewicz, Calumet City; Ernest Hutter, Wilmette, all of Ill.

[73] Assignee: The United States of America as represented by the United States Atomic Energy Commission, Washington, D.C.

[22] Filed: Oct. 6, 1972

[21] Appl. No.: 295,779

[52] U.S. Cl. .................................. 176/15, 176/78
[51] Int. Cl. ............................................. G21c 3/00
[58] Field of Search ............... 176/15, 75, 76, 78, 176/85

[56] References Cited
UNITED STATES PATENTS 3,702,803  11/1972  Huebotter ......................... 176/78
3,677,893   7/1972  Huebotter et al. ................ 176/78
3,230,148   1/1966  Hooper ........................... 176/76 X Primary Examiner—Harvey E. Behrend
Attorney—John A. Horan

[57] ABSTRACT

An irradiation subassembly for use in a nuclear reactor includes a bundle of slender elongated irradiation capsules or fuel elements enclosed by a coolant tube and having a yieldable retaining liner between the irradiation capsules and the coolant tube. For a hexagonal bundle surrounded by a hexagonal tube the yieldable retaining liner may consist either of six segments corresponding to the six sides of the tube or three angular segments each corresponding to two adjacent sides of the tube. The sides of adjacent segments abut and are so cut that metal-to-metal contact is retained when the volume enclosed by the retaining liner is varied and springs are provided for urging the segments toward the center of the tube to hold the capsules in a closely packed configuration.

4 Claims, 5 Drawing Figures

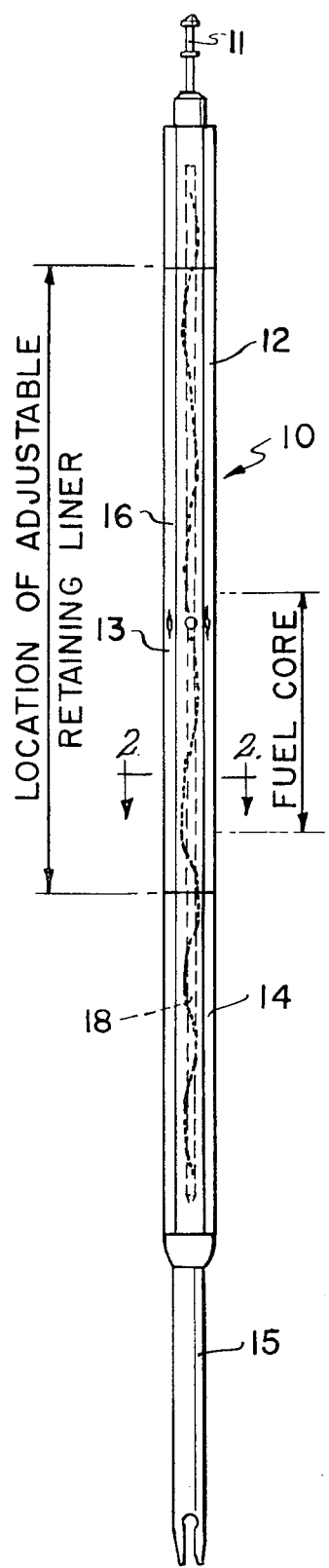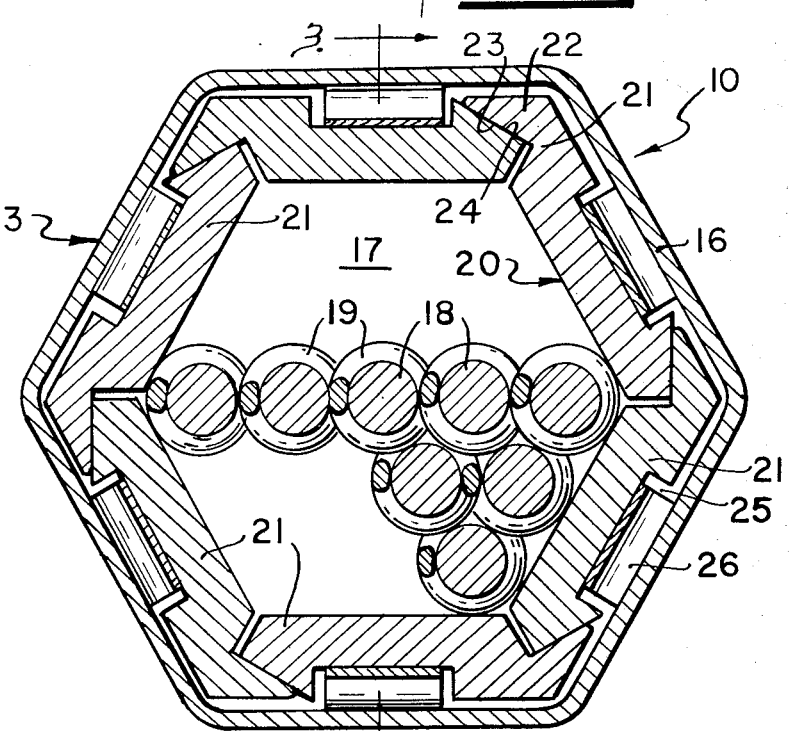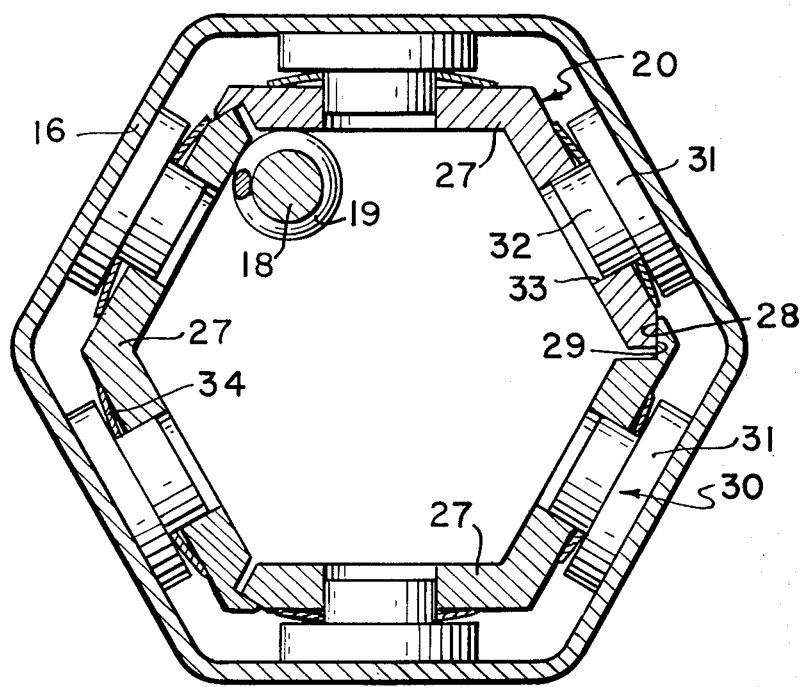

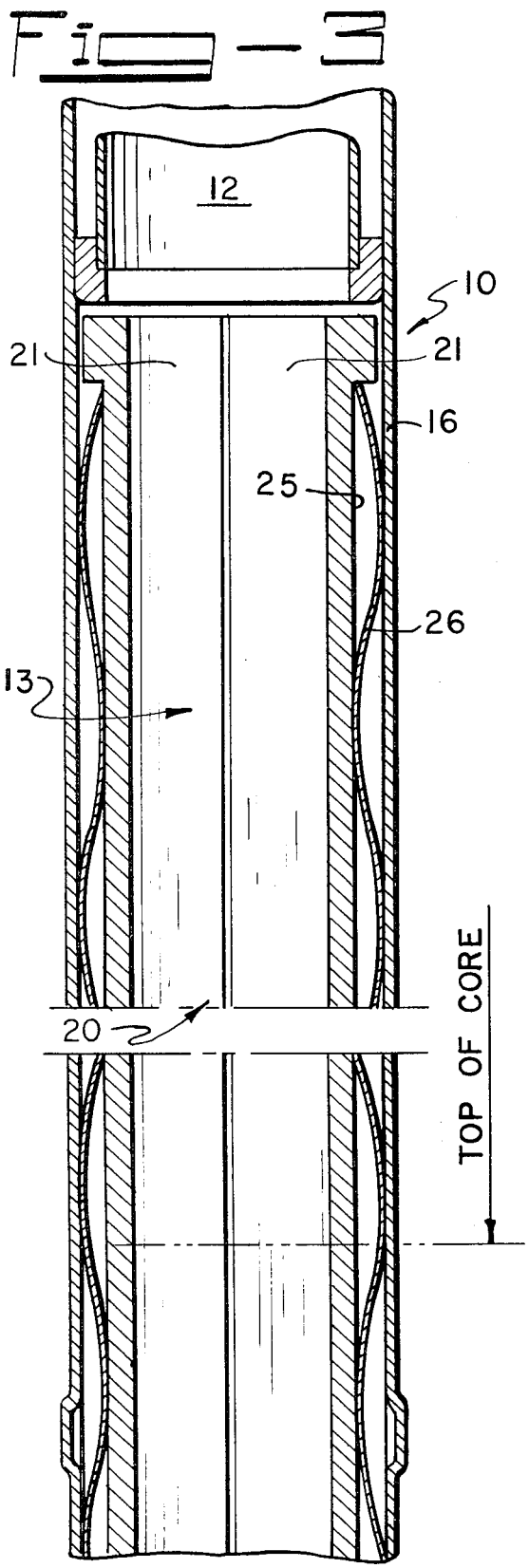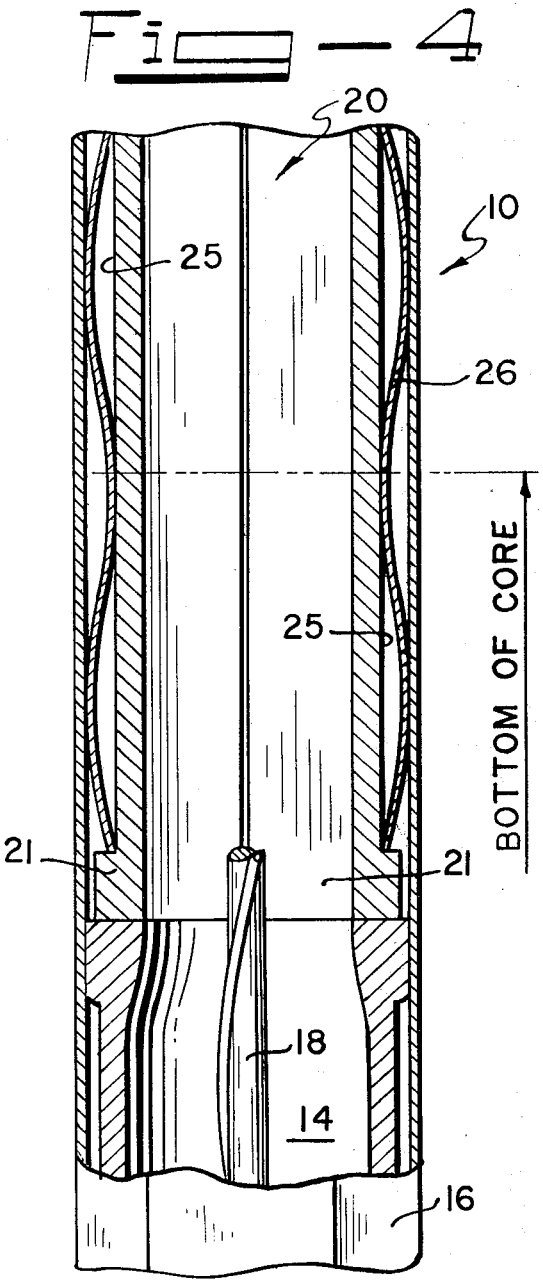

IRRADIATION SUBASSEMBLY

CONTRACTUAL ORIGIN OF THE INVENTION

The invention described herein was made in the course of, or under, a contract with the United States Atomic Energy Commission.

BACKGROUND OF THE INVENTION

This invention relates to an irradiation subassembly for use in a nuclear reactor. In more detail, the invention relates to a subassembly useful for irradiating experimental fuels and materials in a fast reactor.

Fast breeder reactors now being designed typically include a plurality of fuel assemblies each consisting of a bundle of spaced, parallel, elongated fuel pins containing nuclear fuel enclosed within a coolant duct through which liquid sodium flows. The fuel material in the fuel pins is protected from the sodium by cladding which is compatible with the sodium and has a reasonably low cross section for neutrons. The total number of fuel pins required for a power reactor is very large — on the order of 100,000.

To ensure optimum performance from the fuel pins and structural material employed in such a reactor, a large number of tests must be performed on fuel pins of widely different characteristics in an environment as similar as possible to that of a fast breeder power reactor. Special subassemblies containing irradiation capsules are used for this purpose in the Experimental Breeder Reactor II at the National Reactor Test Station, Arco, Idaho, and a typical core loading of EBR-II comprises about 90 subassemblies of which perhaps one-quarter contain experimental material. Since experimental material is present in the irradiation subassemblies, it can be expected that at least some of the subassemblies will swell to a much greater extent than will subassemblies in a power reactor. It is thus desirable to provide for a substantial amount of swelling in these irradiation subassemblies while maintaining the fuel pins in a closely packed compact bundle as is necessary in all fast reactors.

SUMMARY OF THE INVENTION

According to the present invention, a segmented retaining liner is provided between the bundle of irradiation capsules and the coolant duct surrounding the irradiation capsules in an irradiation subassembly. Spring means are provided for urging the segments toward the center of the subassembly and the sides of the segments are so constructed that sides of adjacent segments overlap in slidable abutting relationship whereby metal-to-metal contact is retained as the bundle swells.

BRIEF DESCRIPTION OF THE DRAWING

FIG. 1 is a side elevation of an irradiation subassembly embodying the present invention.

FIG. 2 is an enlarged horizontal cross-section taken on the line 2—2 in FIG. 1.

FIG. 3 is an enlarged partial vertical cross-section taken on the line 3—3 in FIG. 2, showing part of the upper portion of the irradiation subassembly.

FIG. 4 is a similar view showing part of the lower portion of the irradiation subassembly.

FIG. 5 is a horizontal cross-section of a modification.

SPECIFIC EMBODIMENT OF THE INVENTION

As shown in the drawing, an irradiation subassembly 10 according to the present invention includes a handling member 11, an upper blanket zone 12, a fuel zone 13, a lower blanket zone 14 and an adapter 15 similarly disposed to those of a conventional fuel subassembly. An outer hexagonal tube 16 encloses the fuel and blanket zones of the assembly.

A bundle 17 of slender, elongated cylindrical irradiation capsules 18 (see FIG. 2) is disposed in hexagonal tube 16 in similar fashion to the fuel pins of a conventional fuel subassembly. Each of the irradiation capsules has a single, helical spacer rib 19 of uniform depth on the exterior thereof, the helical ribs on all of the irradiation capsules 18 within an irradiation subassembly 17 having the same pitch, depth and orientation.

Thus far, of course, the description of the irradiation subassembly is simply that of a conventional fuel subassembly. In accordance with the present invention, however, a yieldable segmented retaining liner 20 of a special form is provided between the bundle 17 of irradiation capsules and the hexagonal tube 16 extending from a point below the bottom of the fuel zone 13 to a point above the top of the fuel zone 13. The retaining liner includes two features of importance, one being spring means for urging the several segments of the retaining liner toward the center of the subassembly to hold the bundle of capsules in a closely packed compact mass and the other being means whereby metal-to-metal contact between segments is retained to prevent bypass flow of sodium coolant when the bundle swells. Two different species of this invention are shown in the drawing, the preferred embodiment shown in FIGS. 1–4 being the first to be described.

According to the preferred form of the invention, the retaining ring consists of six identical segments 21, the transverse cross section of each segment being a modified 30°–60° isosceles trapezoid having its two parallel sides parallel to two of the sides of the hexagonal tube 16. To provide bearing surfaces on each segment which remain in metal-to-metal contact as the bundle 17 swells, a projecting portion 22 which is in cross section a 30°, 60°, 90° triangle having a bearing surface 23 at right angles to one of the nonparallel sides of the trapezoid is added to this side of the trapezoid and a similar portion cut from the other nonparallel side of the trapezoid forming a bearing surface 24. The segments are arranged in a hexagon with the bearing surface 23 of one segment contacting the bearing surface 24 of the adjacent segment. An opening 25 is provided in the side of each segment adjacent the side of the hexagonal tube 16 extending nearly the complete length of the segment 21 in which a strip spring 26 urges each segment 21 toward the center of the tube 16. Other types of spring also, of course, could be employed.

A modified form of retaining liner is shown in FIG. 5. According to this form of the invention, the retaining liner 20 is composed of but three angular segments 27, each segment covering two adjacent sides of hexagonal tube 16. The abutting ends of adjacent segments are modified similarly to the embodiment shown in FIGS. 2 to 4 to provide bearing surfaces 28 and 29 on adjacent surfaces whereby metal-to-metal contact is retained as the fuel bundle swells to prevent bypass flow of sodium coolant. A vertical row of spacer buttons 30 having an enlarged portion 31 which contacts hexagonal tube 16 and a narrow portion 32, extending through openings 33 in segments 27 is provided for each side of the hexagonal tube. Spacer buttons may, for example, be spaced about 12 inches apart. A Belleville spring 34 is provided between segments 27 and the enlarged portion 31 of each button 30.

The embodiment of the invention in which an exclusive property or privilege is claimed are defined as follows:

1. An irradiation subassembly for use in a nuclear reactor comprising a multisided bundle of slender, elongated irradiation capsules enclosed within a coolant tube of the same cross-sectional shape and a segmented yieldable retaining liner disposed between the capsules and the coolant tube, and said capsules spaced apart by helical means said retaining liner consisting of a plurality of identical segments, each segment having opposite sides parallel to the sides of the coolant tube and opposite nonparallel ends, said ends being cut to form bearing surfaces at right angles to the nonparallel ends of the segment, the bearing surfaces on adjacent segments overlapping and in contact with one another, said bearing providing continuous metal-to-metal contact surfaces as the yieldable retaining liner expands or contracts and spring means for urging the liner toward the center of the tube, said liner applying pressure on said capsules.

2. An irradiation subassembly according to claim 1 wherein the bundle of capsules and the coolant tube surrounding the bundle are hexagonal in cross section.

3. An irradiation subassembly according to claim 2 wherein the yieldable retaining liner consists of six identical segments corresponding to the six sides of the hexagonal tube, each segment being in cross section a modified 30°–60° isosceles trapezoid having its two parallel sides parallel to two of the sides of the hexagonal tube, the modification consisting of a projecting portion which is in cross section a 30°–60°–90° triangle having a bearing surface at right angles to the nonparallel sides of the segment added to one nonparallel side and cut away from the other nonparallel side, the bearing surfaces of adjacent segments being in abutting relation and a spring between each segment and the corresponding side of the hexagonal tube.

4. An irradiation subassembly according to claim 2 wherein the yieldable retaining liner consists of three identical angular segments, each segment corresponding to two adjacent sides of the hexagonal tube, each segment having two parallel sides parallel to two of the sides of the hexagonal tube and two other sides parallel to two other sides of the hexagonal tube, a row of buttons along each wall of the hexagonal tube having a smaller portion fitting into openings in the flat portion of the segments and springs between the segments and the larger portion of the buttons.

* * * * *